(12) United States Patent
Bettinger

(10) Patent No.: US 6,474,808 B1
(45) Date of Patent: Nov. 5, 2002

(54) SPECTACLE-MOUNTED OCULAR DISPLAY APPARATUS

(76) Inventor: David S. Bettinger, 8030 Coventry, Grosse Ile, MI (US) 48138-1119

( * ) Notice: Subject to any disclaimer, the term of this patent is extended or adjusted under 35 U.S.C. 154(b) by 0 days.

(21) Appl. No.: 09/451,029

(22) Filed: Nov. 29, 1999

(51) Int. Cl.⁷ .................................................. G02C 1/00
(52) U.S. Cl. ........................................ 351/41; 351/158
(58) Field of Search ............................ 351/50, 158, 41

(56) References Cited

U.S. PATENT DOCUMENTS

| | | | | |
|---|---|---|---|---|
| 4,806,011 A | * | 7/1987 | Bettinger | 351/158 |
| 4,867,551 A | * | 9/1989 | Perera | 351/158 |
| 5,100,328 A | * | 3/1992 | Badgley | 351/158 |
| 5,539,422 A | * | 7/1996 | Heacock et al. | 351/158 |

* cited by examiner

Primary Examiner—Huang Xuan Dang

(57) ABSTRACT

Performance improved spectacle-mounted ocular display apparatus, where the addition of a movable relay mirror mounting assembly provides for image focusing and placement, framing, and orientation/alignment by permitting both translational and rotational movement of the relay mirror. This movement of the relay mirror mounting assembly in turn causes an optical change in the distance of the image from the eye. The performance improvement results from the ability to change the distance between image source and the relay mirror thereby providing a means for increasing the range of image placement and focus adjustment.

4 Claims, 4 Drawing Sheets

SPECTACLE-MOUNTED OCULAR DISPLAY APPARATUS

BACKGROUND OF THE INVENTION a) Field of the Invention

The present invention relates to a performance improved spectacle-mounted display apparatus using a concave surface of a spectacle lens as a primary reflector wherein the improvement comprises the addition of a movable relay mirror mounting assembly possessing a bracket whose translational movement causes framing adjustments and a change in the distance of the relay mirror from the object.

b) Description of the Prior Art

Objects viewed through a magnification system require a set of adjustments of the optical train to ensure satisfying the following conditions: (1) focus control and image placement—the image is resolute and a specified distance from the viewer, (2) framing of the image within the viewing area—the entire image is in view, and (3) image alignment/orientation—the image is without geometrical distortion.

The use of an optical eyepiece consisting of mirrors on two or more axes for personal display of optical information, wherein a portion of the spectacle lens is used as a concave primary reflector, is known. Bettinger, U.S. Pat. No. 4,806,011, uses the cavity between the spectacle lens and the eye to position the basic elements of a magnification system for the purpose of developing a portable, lightweight, inexpensive personal optical system. The key feature of Bettinger is the use of a section of the concave surface of the spectacle lens as a primary reflector. Bettinger allows for focus adjustment only by selection of S different curvatures of the mirrors. Bettinger allows for alignment/orientation of the image by bending or manipulation of a flexible relay mirror support arm. Bettinger does not provide a means for adjusting image location and focus control by changing the distance between the elements of the optical system. Bettinger does not provide a means for vertical movement of the relay mirror in order to align the center of the relay mirror at the same vertical height with the center of the eye.

SUMMARY OF THE INVENTION

In the prior art, it has been found that small adjustments of the relay mirror may cause substantial changes in the image in terms of location and framing. In order to overcome the above-mentioned deficiencies and problems with respect to the ability to make precise adjustments in the prior art, this invention teaches a novel spectacle-mounted ocular display apparatus, the performance improvements enhancing image quality and adjustment. One performance improvement comprising the addition of a movable relay mirror mounting assembly provides aid for image focusing and placement, framing, and orientation/alignment by permitting translational and rotational movement of the relay mirror.

More specifically this movable relay mirror mounting assembly comprises a) at least two continuous contact tracks integral with, and in close proximity and attached to, the spectacle frame in a generally parallel relation to an extension of the image path that crosses the facial cavity of the eye, and b) a bracket with runner means of engaging and maintaining at least three contact points with at least two of the contact tracks, furthermore the bracket integral with, and in close proximity and attached to, the relay mirror support arm at the end opposing the relay mirror, c) whereby translational movement of the bracket along the length of the tracks causes a change in the distance of the relay mirror from the object which in turn causes both an optical change in the distance of the image from the eye and a change in control of image focus quality.

The addition of a vertical adjustment control assembly, for relay mirror vertical displacement, connects the horizontally moveable bracket to the relay mirror support arm and furthermore the vertical adjustment control assembly comprises a) at least two continuous contact tracks integral with, and in close proximity and attached to, the bracket in a generally perpendicular relation to the image path that crosses the facial cavity of the eye, and b) a vertical adjustment control with runner means of engaging and maintaining at least three contact points with at least two of the contact tracks, c) whereby translational movement of the vertical adjustment control along the length of the tracks causes vertical movement of the relay mirror providing the means to aid in the avoidance of image skewing and distortion.

The addition of a setscrew adjustable and controllable hinge connecting the horizontal translation retainer to the relay mirror support arm provides for the change in relay mirror angle relative to the primary mirror providing assistance for the fine framing adjustment of the object.

Another performance improvement comprises the addition of an elastic pivot and hinge, selected to be adjustable and controllable by precision means, which connects the relay mirror support arm to the relay mirror. This provides for a change in relay mirror angle relative to the primary mirror providing assistance for fine framing adjustment of the object.

The precision means of adjusting and controlling this hinge is accomplished by a thumbscrew circular wedge, a setscrew, or other such appropriate precision means.

1. Objects of the Invention

A general object of this invention is to provide for the adjustment in the distance of the image plane from the viewer. For example, a worker at a computer workstation will desire the plane of the virtual image to be at the same perceived distance as the desktop display of between 24 to 30 inches.

Another general object of this invention is to provide for a more precise adjustment of focus.

A still further object of this invention is to provide for a more precise horizontal adjustment for framing of the image within the viewing area.

A still further object of this invention is to provide for a more precise vertical adjustment for framing of the image within the viewing area.

A still further object of this invention is to provide for image focusing so as to accommodate variations in individual visual capability with standard glasses.

2. Features of the Invention

In keeping with these objects and others that will become apparent hereinafter, one feature of the present invention resides, briefly stated, in the movable relay mirror mounting assembly that permits the translational movement of the relay mirror relative to the spectacle frame. This provides the spectacle wearer with the ability to focus and adjust placement of the image.

An additional feature of the present invention resides in the vertical adjustment control assembly whose continuous contact tracks permit the vertical translational movement of the relay mirror relative to the spectacle frame. Precise control of a small vertical displacement cannot be accomplished by a mere bending of the support arm.

A further feature of the present invention resides in the setscrew adjustable and controllable hinge connecting the horizontal translation retainer and the relay mirror support arm. This setscrew hinge provides a means of fine adjustment of the relay mirror angle relative to the primary mirror. Precise horizontal adjustments for framing of the image cannot be accomplished by a mere bending of the support arm.

A still further feature of the present invention resides in the precision thumbscrew adjustable and controllable hinge connecting the relay mirror support arm and the relay mirror. This wedge wheel feature provides a means of fine horizontal adjustment of the relay mirror angle relative to the primary mirror. This ability to achieve fine framing of the image can't be accomplished by a mere manipulation of a flexible support arm.

It will be understood by one of ordinary skill in the art that horizontal alignment of the optical plane may require vertical adjustment of the image source, in addition to vertical adjustment of the relay mirror.

It will be additionally understood by one of ordinary skill in the art that a distortion free image may require adjustments to vertically orient the image source parallel with the sagittal plane.

It will be further understood by one of ordinary skill in the art that adjustments of the object may be required to achieve proper framing.

It will be still further understood by one of ordinary skill in the art that an individual's deviation of visual acuity may be greater than that which could be accommodated by translational adjustment alone of the present invention and a different lens curvature may be required.

It will be still further understood by one of ordinary skill in the art that the horizontal contact tracks may be shaped to generate a locus of motion of the relay mirror to proscribe a change in angle relative to the primary lens that maintains the axis of the image line centered on the relay mirror.

It will be still further understood by one of ordinary skill in the art that the connection of the continuous contact tracks to the spectacle frame may be selected to provide for a temporary connection of the relay mirror mounting assembly to the spectacle frame for purposes of safety and convenience during storage and transport.

It will be still further understood by one of ordinary skill in the art that the translational movement of the horizontally movable bracket along the length of its tracks causes a change in the distance of the relay mirror from the object which may serve to cause both an optical change in the distance of the image from the eye and a change in image focus quality where the preferred plane of focus of the eye is different than the perceived image plane of the personal display.

Numerous alterations of the mechanisms of precise image adjustments herein discussed will suggest themselves to those skilled in the art. However it is understood that the present disclosure of these mechanisms are for purposes of illustration only and not to be construed as a limitation of the present invention. All such modifications which do not depart from the spirit of the invention are intended to be included within the scope of the appended claims.

BRIEF DESCRIPTION OF THE DRAWINGS

The present invention is further described with reference to the accompanying drawings in which.

DETAILED DESCRIPTION OF THE DRAWINGS

Figure 1:
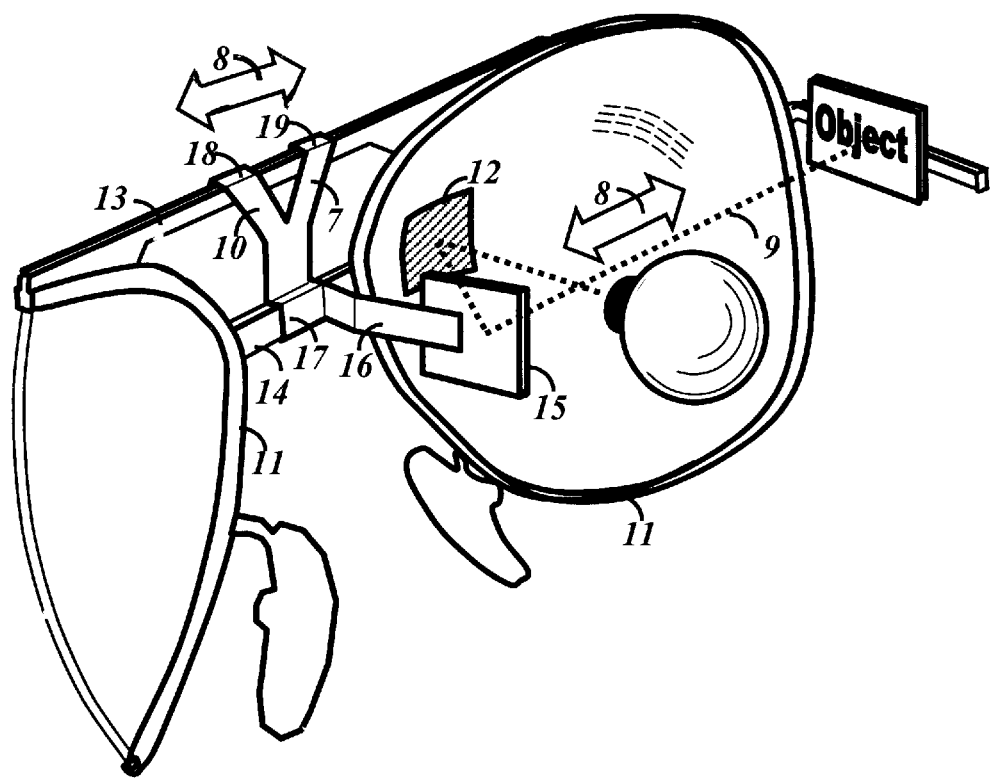
FIG. 1 is a perspective view from within the back of a glasses frame showing a relay mirror mounting assembly with horizontal translational movement.

In FIG. 1 the present invention comprises a movable relay mirror mounting assembly (10) integral with a support arm (16) holding relay mirror (15) attached to the spectacle frame (11) between the lenses at the bridge of the nose, and a first-surface primary mirror (12) adjacent to the nose formed by silvering a surface of the lens. The movable relay mirror mounting assembly (10) consists of a bracket (7) with runners (17,18,19) engaging and maintaining at least three contact points with the bridge crosspieces (13,14) of the frame (11) serving as the continuous contact tracks with a smooth surface. The bracket (7) possesses the freedom to translate back and forth (8) across cross-pieces (13,14) serving as the continuous tracks in a generally parallel relation to an extension of the image path (9) that crosses the facial cavity of the eye.

Figure 2:
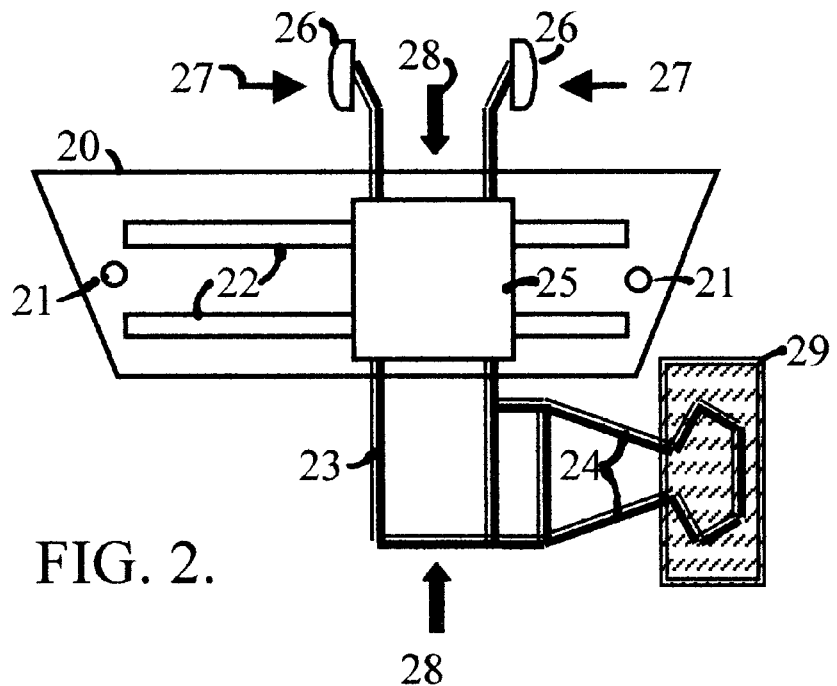
FIG. 2 is a back view of a bracket with an attached relay mirror mounting assembly possessing both vertical and horizontal translational movement to be mounted on the bridge of a pair of glasses.

In FIG. 2 the relay mirror mounting assembly comprises an add-on support bracket (20) possessing horizontal tracks (22) with connection means (21) to the spectacle frame, and a horizontally moveable bracket (25) with internal tracks that traverses the horizontal tracks (22). The vertical adjustment control assembly comprises a) two continuous contact tracks integral with and internal to the horizontally moveable bracket (25) in a generally perpendicular relation to the image path that crosses the facial cavity of the eye, and b) vertical adjustment control pads (26) connecting to and governing a set of parallel runners (23) engaging and maintaining at least three contact points with the two vertical contact tracks, c) whereby translational movement (27) of the vertical adjustment control pads (26) along the length of the tracks permits vertical movement (28) of the runners (23), and hence of the relay mirror support arm (24), and hence of the attached relay mirror (29) itself. The wearer gently squeezes the vertical adjustment control pads (26) in a direction towards each other (27). This application of force causes the width of the runners (23) to become narrower than the internal track width permitting vertical movement of the runners (23) to occur.

Figure 3:
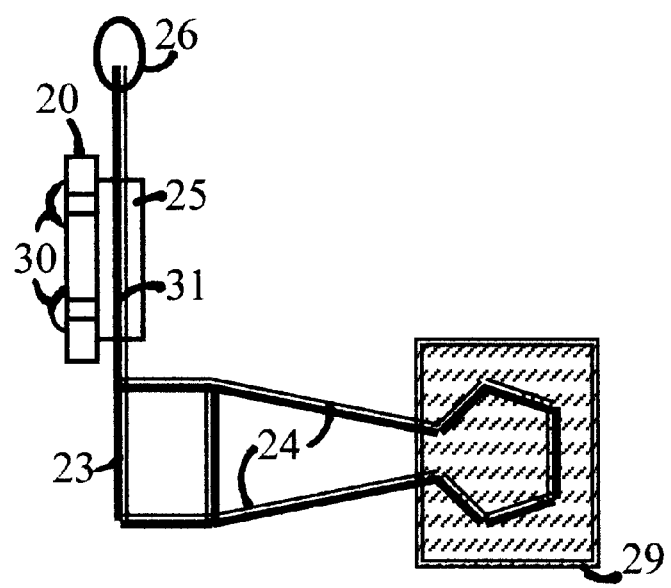
FIG. 3 is a vertical section through a vertical adjustment control assembly at the horizontally moveable bracket.

In FIG. 3 the relay mirror mounting assembly comprises an add-on support bracket (20) possessing horizontal tracks with connection means to the spectacle frame, and a horizontally moveable bracket (25) with internal tracks (31) that traverses the horizontal tracks. The horizontally moveable bracket (25) possesses horizontal runners (30), represented as rivets with retainer heads. The vertical adjustment control assembly comprises a) two continuous contact tracks (31) integral with and internal to the horizontally moveable bracket (25), and b) vertical adjustment control pads (26) connecting to and governing a set of parallel runners (23) engaging and maintaining at least three contact points with the two vertical contact tracks (31), c) whereby translational movement of the vertical adjustment control pads (26) permits vertical movement of the runners (23), and hence of the relay mirror support arm (24), and hence of the attached relay mirror (29) itself. Sufficient tension exists between the vertical runners (23) and the vertical contact tracks(31) to prevent motion of the relay mirror support arm (24). The squeezing of the vertical adjustment control pads (26) releases the tension that keeps the vertical runners (23) bowed out, thus permitting vertical movement of the vertical runners (23) in the vertical contact tracks (31).

Figure 4:
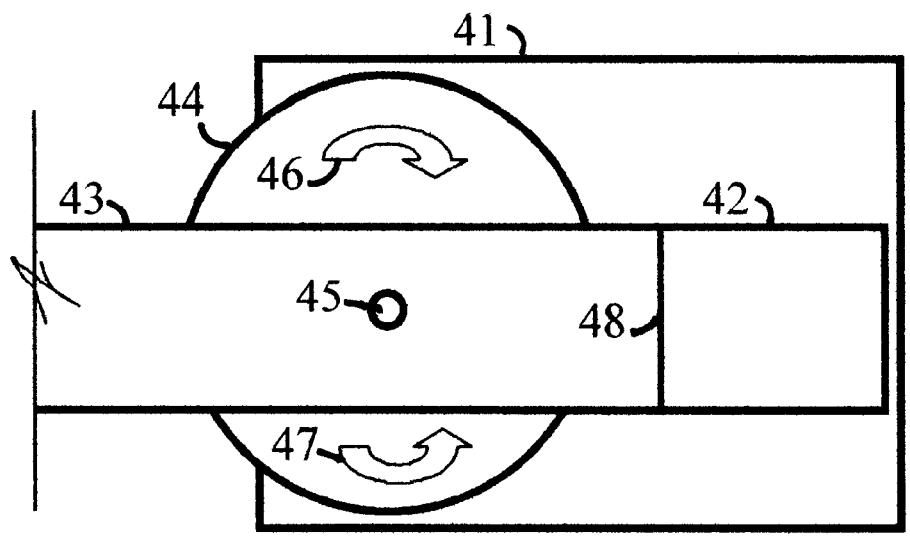
FIG. 4 is a back view of a relay mirror support arm with an adjustable wedge wheel hinge.

In FIG. 4 a thumbscrew adjustable and controllable hinge (44) connects the relay mirror support arm (43) to the relay mirror (41). The thumbscrew adjustable wheel (44) is a circular wedge which rotates on the thumbscrew wheel axle (45). This circular wedge possesses a circumference of varying thickness. As the wheel is rotated in a clockwise direction (46), the circumferential thickness increases and the area of attachment and support to the relay mirror (42) and hence the relay mirror (41) increasingly bends about the bend point for the spring steel relay mirror support arm (48) and towards the wearer. Conversely, if then the wheel is rotated in a counterclockwise direction (47), the circumferential thickness decreases and the area of attachment and support to the relay mirror (42) and hence the relay mirror (41) decreasingly bends about the bend point for the spring steel relay mirror support arm (48) and away from the wearer.

Figure 5:
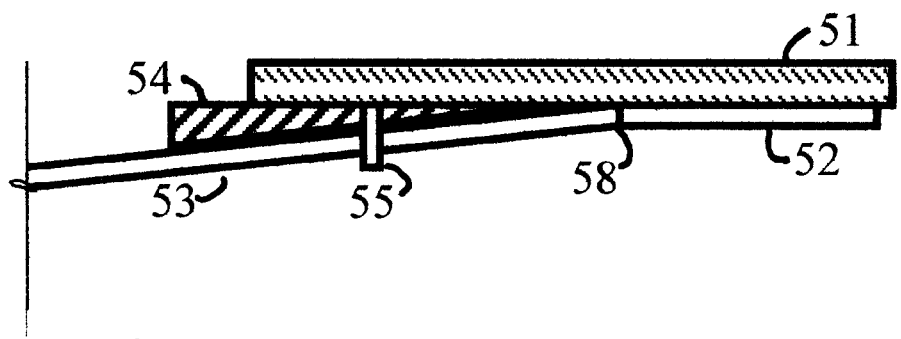
FIG. 5 is a horizontal section through a relay mirror support arm.

In FIG. 5 a thumbscrew adjustable and controllable hinge (54) connects the relay mirror support arm (53) to the relay mirror (51). This circular wedge (54) rotates on the thumbscrew wheel axle (55). As the wheel is rotated in either direction from the position shown, any change in circumferential thickness interposes to change the amount of bending of the area of attachment and support to the relay mirror (52) with its attached relay mirror (51) about the bend point (58). Thus, the angle of the relay mirror (51) in relation to the relay mirror support arm (53) changes.

Figure 6:
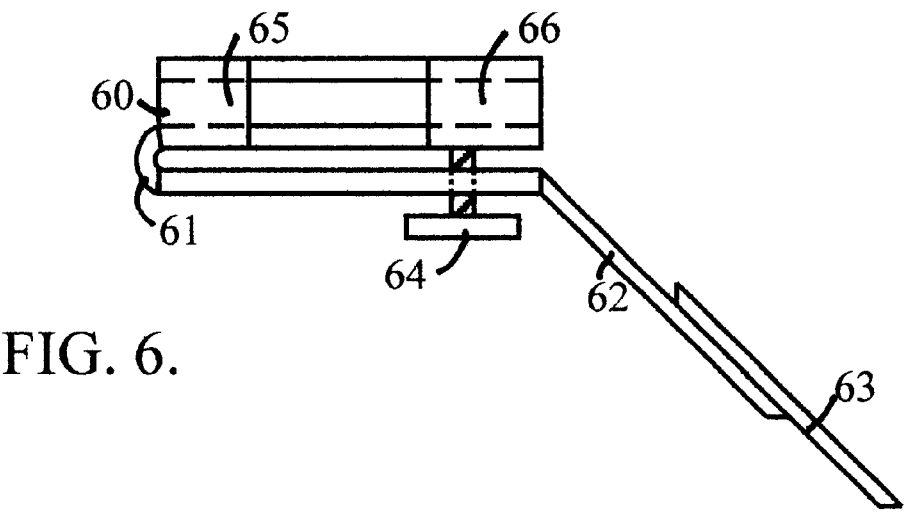
FIG. 6 is a plan view of an adjustable horizontally translational retainer.

In FIG. 6 a horizontally translational retainer (60) with its horizontal runners (65,66) is connected to the relay mirror support arm (62) retaining the relay mirror (63). This setscrew hinged connection comprises a hinge (61) adjustable and controllable by means of a setscrew (64) which precisely controls the angle of the relay mirror support arm (62) retaining the relay mirror (63) relative to the primary mirror.

Figure 7:
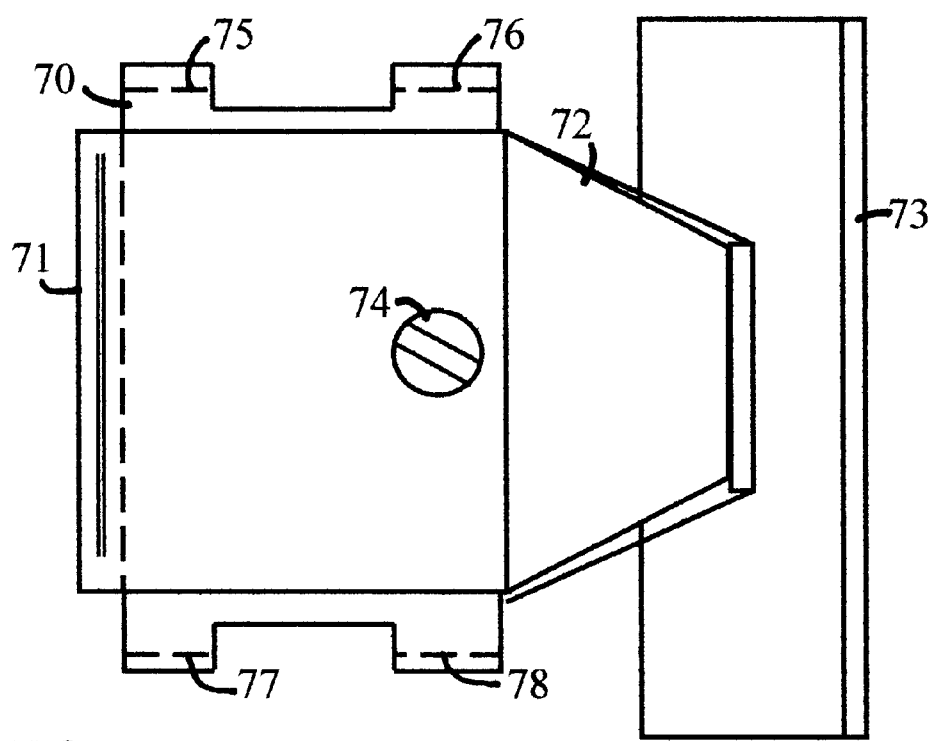
FIG. 7 is a back view of an adjustable horizontally translational retainer showing a setscrew hinge.

In FIG. 7 the horizontally translational retainer (70) with its horizontal runners (75,76,77,78) is connected to the relay mirror support arm (72) retaining the relay mirror (73). A small screwdriver is used to manipulate the adjustable setscrew (74) which controls hinge (71), precisely varying the distance of the relay mirror support arm (72) from the horizontally translational retainer (70), thereby controlling the angle of the relay mirror support arm (72) relative to the primary mirror.

DESCRIPTION OF THE PREFERRED EMBODIMENT

Technician's Data Adjunct

The preferred embodiment of the present invention is as an enhancement to a spectacle-mounted ocular display apparatus used as a technician's personal display device combining alphanumeric text and images. Such displays supply diagnostic data to aircraft technicians. In such a case the technician may desire the image plane close to his face, equivalent to his work, or in other cases may desire the image plane at a distance.

The continuous contact tracks may be constructed out of metal or plastic. The track surface is selected from smooth surface, toothed surface, threaded groove surface, or other such appropriate surface. The preferred tracks are selected to be the two parallel metal bridge pieces of the spectacle frame with a smooth surface.

The horizontally movable bracket may be constructed out of metal or plastic. The preferred bracket is of metal construction. The bracket and the track are high tolerance tooled to ensure a precision permanent connection between the bracket and the track on which it translates horizontally. The bracket runner surface is selected from smooth surface, toothed surface, threaded groove surface, or other such appropriate surface. As the preferred track surface is smooth, the preferred bracket runner is also smooth. The runners may be selected from bearings, the smooth edges of a bracket, or other appropriate bracket track means of contact. The preferred runners are the smooth edges of a horizontally movable bracket that slide along the track in a grip-slip manner.

The vertical adjustment control assembly is constructed of metal and/or plastic. The preferred metal vertical adjustment control with runner means engages and maintains contact points with two continuous vertical plastic tracks. The preferred tracks are internal to the horizontally movable bracket. The vertical adjustment control construction and the track are high tolerance molded and/or tooled to ensure a precision permanent connection between the adjustment control and the track on which it translates vertically. The track surface is selected from smooth surface, toothed surface, threaded groove surface, or other such appropriate surface. The preferred tracks are selected to be two parallel plastic tracks with a smooth surface. The preferred smooth wire metal runners slide along the track in a grip-slip manner.

Vertical orientation of the relay mirror requires that a degree of freedom for centering the object in the field of view be incorporated into the connections at either end of the relay mirror support arm. This requirement can be meet by an appropriate elastic hinged mechanism. The preferred embodiment utilizes a thumbscrew adjustable and controllable elastic hinge connection between the relay mirror support arm and the relay mirror. This hinge allows for precise adjustments in the relay mirror angle relative to the primary mirror.

What is claimed is:

1. A spectacle mounted ocular displayed apparatus, the performance improvement comprising the addition to a movable relay mirror mounting assembly, said assembly comprising at least two continuous contact tracks integral with, and in close proximity and attached to, a spectacle frame in a generally parallel relationship to the bridge of said spectacle frame, and a bracket with runner means of engaging and maintaining at least three contact points with at least two of said contact tracks, furthermore said bracket integral with, and in close proximity and attached to, the relay mirror support arm at the end opposing the relay mirror, whereby translational movement of said bracket along the length of said tracks causes a change in the distance of said relay mirror from an object on the temple of said spectacle frame which in turn causes an optical change in the focus of the image from the eye.

2. The improved spectacle-mounted ocular display apparatus of claim 1, wherein the addition of a vertical adjustment control assembly, for relay mirror vertical displacement, connects the horizontally moveable bracket to the relay mirror support arm and furthermore said vertical adjustment control assembly comprises

- at least two continuous contact tracks integral with, and in close proximity and attached to, said bracket in a generally perpendicular relationship to said spectacle frame, and
- a vertical adjustment control with runner means of engaging and maintaining at least three contact points with at least two of said contact tracks,
- whereby translational movement of said vertical adjustment control along the length of said tracks causes a change in the vertical distance of the relay mirror in order to be able to avoid skewing and distortion of the image.

3. The improved spectacle-mounted ocular display apparatus of claim 1, wherein the addition of a setscrew adjustable and controllable elastic pivot, hinge and bend point connecting the horizontally translational retainer to the relay mirror support arm provides for change in the relay mirror angle relative to the first surface primary mirror and reflector on the concave surface of the spectacle lens providing for centering of the object in the field of view, thus providing for the fine framing adjustment of the image in the horizontal direction.

4. A spectacle-mounted ocular display apparatus of claim 1, the performance improvement comprising the addition of an elastic pivot, hinge and bend point, selected to be adjustable and controllable by precision means, connecting said relay mirror support arm to the relay mirror provides for a change in said relay mirror angle relative to said first surface primary mirror and reflector on the concave surface of the spectacle lens providing for centering of the object in the field of view, thus providing for the fine framing adjustment of the image in the horizontal direction.

\* \* \* \* \*